UNITED STATES PATENT OFFICE.

HENRY PARKES, OF LONDON, ENGLAND, AND JOHN CUNINGHAME MONT-
GOMERIE, OF DALMORE, STAIR, SCOTLAND.

PROCESS OF EXTRACTING GOLD OR SILVER.

SPECIFICATION forming part of Letters Patent No. 496,950, dated May 9, 1893.

Application filed May 31, 1892. Serial No. 435,103. (No specimens.) Patented in England July 3, 1891, No. 11,342; in India June 7, 1892, No. 142; in Cape Colony June 11, 1892, No. 769, and in Brazil June 25, 1892, No. 1,473.

*To all whom it may concern:*

Be it known that we, HENRY PARKES, of 237 Friern Road, Dulwich, London, in the county of Surrey, England, and JOHN CUNINGHAME MONTGOMERIE, of the Water of Ayr and Tam O'Shanter Hone Works, Dalmore, Stair, in the county of Ayr, Scotland, subjects of the Queen of Great Britain and Ireland, have invented certain new and useful Improvements in the Process of Extracting Gold or Silver from Ores or Compounds Containing the Same, (for which we have obtained Letters Patent in Great Britain, dated July 3, 1891, No. 11,342; in British India, dated June 7, 1892, No. 142; in Cape Colony, dated June 11, 1892, No. 769, and in Brazil, dated June 25, 1892, No. 1,473,) of which the following is a specification.

This invention relates to the treatment of auriferous and argentiferous ores or compounds for the purpose of separating and collecting the gold and silver contained therein; the same being specially adapted for use with ores of a refractory character.

In carrying out our invention, the ore having been reduced to a finely-triturated state (capable of passing through a sieve having sixty meshes to the linear inch) is treated at a single operation in the following manner:—

To one ton of ore, moistened until converted to the consistency of thin mortar, we add (according to the character of the ore to be treated and the quantities of the gold or silver present) from five pounds to twenty-five pounds of cyanide of potassium, and subject the same to agitation in the presence of oxygen (in any of its various conditions, as passive, or active as ozone) under pressure for from four to six hours. The oxygen may be derived from the peroxide of hydrogen or other source. A pressure of from fifty pounds to one hundred pounds per square inch will usually be found convenient. The oxygen is then drawn off for further use, and the contents of the barrel filtered and washed in the usual manner.

We have found this process well adapted for employment with ore containing from forty ounces to sixty ounces of silver, and from one ounce to two and one-half ounces of gold per ton; eighteen pounds of cyanide of potassium to the ton being used.

To obtain the full effect of the oxygen, the air in the barrel should first be exhausted before applying the oxygen.

It will in certain cases be found advantageous to separate some of the earth or silicious matters from the ores by a concentrating or winnowing process, or by means of a centrifugal or other concentrating machine.

What we claim as our invention, and desire to secure by Letters Patent, is—

1. The herein-described method of extracting gold and silver from ores or compounds containing the same, consisting in treating the ore with cyanide of potassium in the presence of oxygen under pressure.

2. The herein-described process for extracting gold and silver from ores or compounds containing the same by an uninterrupted operation consisting in treating the ore with cyanide of potassium in the presence of oxygen under pressure and subjecting the same to agitation, the ore being subsequently filtered and washed and the precious metals recovered from the liquor by precipitation or other known means.

HENRY PARKES.
JOHN CUNINGHAME MONTGOMERIE.

Witnesses:
F. J. RAPSON,
P. VARNALS.